United States Patent [19]

Saatweber et al.

[11] Patent Number: 5,039,720

[45] Date of Patent: * Aug. 13, 1991

[54] AQUEOUS ELECTROPHORETIC ENAMEL COATING MATERIALS, WHICH CAN BE DEPOSITED AT THE CATHODE CROSSLINKED WITH METHANE TRICARBOXYLIC ACID AMIDES OF MALONIC ACID DERIVATIVES

[75] Inventors: Dietrich Saatweber; Georg Hendriux, both of Wuppertal; Gerhard Brindöpke, Sulzbach/Ts; Helmut Plum, Taunusstein, all of Fed. Rep. of Germany

[73] Assignee: Hoechst Aktiengesellschaft, Frankfurt, Fed. Rep. of Germany

[*] Notice: The portion of the term of this patent subsequent to Feb. 21, 2006 has been disclaimed.

[21] Appl. No.: 251,673

[22] Filed: Sep. 30, 1988

[30] Foreign Application Priority Data

Oct. 3, 1987 [DE] Fed. Rep. of Germany ....... 3733552

[51] Int. Cl.$^5$ ...................... C08L 75/12; C08L 63/02
[52] U.S. Cl. .................... 523/404; 523/407; 523/408; 523/410; 523/414; 523/415; 523/417; 523/420; 525/111; 525/113; 525/504; 528/45; 528/73; 528/119; 528/120
[58] Field of Search ............... 523/404, 407, 408, 410, 523/414, 415, 417, 420; 525/111, 112, 504; 528/45, 73, 119, 120

[56] References Cited

U.S. PATENT DOCUMENTS

| | | | |
|---|---|---|---|
| 4,198,331 | 4/1980 | Buchwalter et al. | 528/120 |
| 4,248,753 | 2/1981 | Buchwalter et al. | 528/119 |
| 4,694,036 | 2/1987 | Walz et al. | 525/386 |
| 4,704,437 | 11/1987 | Kiessling | 528/121 |
| 4,734,520 | 3/1988 | Plum et al. | 558/392 |
| 4,795,787 | 1/1989 | Walz | 525/386 |
| 4,806,677 | 2/1989 | Walz et al. | 528/119 |
| 4,859,788 | 8/1989 | Brindopke et al. | 528/119 |

FOREIGN PATENT DOCUMENTS 3324211 1/1985 Fed. Rep. of Germany .
3328455 3/1985 Fed. Rep. of Germany .
3530179 2/1987 Fed. Rep. of Germany .
3541140 5/1987 Fed. Rep. of Germany .

Primary Examiner—Earl Nielsen
Assistant Examiner—Frederick Krass
Attorney, Agent, or Firm—Schweitzer Cornman & Gross

[57] ABSTRACT

An aqueous electrophoretic coating material, which can be deposited at the cathode and contains (A) 90 to 50% by weight, based on the total portion of synthetic resin vehicle, of one or several polycondensation, polymerization and/or poly-addition resins, the resin or, in the event that several resins are present, their mixture (a) having a number average molecular weight (Mn) of 700 to 10,000

(b) having $1.2 \times 10^{23}$ to $21.7 \times 10^{23}$ lateral or terminal double bonds per 1,000 g, corresponding to a hydrogenation iodine number of 5 to 90, (c) optionally containing primary and/or secondary hydroxyl groups, corresponding to a hydroxyl number of 0 to 450 mg KOH/g of resin, and (d) tertiary amino groups corresponding to an amine number of 30 to 450 mg KOH/g of resin.

(B) 10 to 50% by weight of one or several cross linking agents, which are compounds with methane tricarboxylic acid amide units of the formula

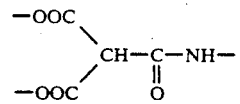

which contain, on the average, at least 2 groups with reactive hydrogens per molecule and are derived from a reaction product of a monoisocyanate or polyisocyanate with a malonic acid derivative, and (C) 0 to 10% by weight of one or several capped diisocyanates and/or polyisocyanates, as well as its use.

7 Claims, No Drawings

AQUEOUS ELECTROPHORETIC ENAMEL COATING MATERIALS, WHICH CAN BE DEPOSITED AT THE CATHODE CROSSLINKED WITH METHANE TRICARBOXYLIC ACID AMIDES OF MALONIC ACID DERIVATIVES

BACKGROUND AND SUMMARY OF THE INVENTION

The advantages of cathodic electrophoretic enameling are described in the technical literature and in patents (Metalloberflache 31 (1977) 10, pages 455–459, EP-A-4 090, AT-C-3 46 989, U.S. Pat. No. 3,922,253, EP-B-66 859).

A disadvantage of the systems described is the use of relative high stoving temperatures of about 170° C., as a result of which the expenditure of much heating energy is required. In the automobile industry, the main user of the cathodic electrophoretic enameling method, these high stoving temperatures prevent the inclusion of plastic parts in car bodies before priming and in some cases reach the melting temperatures of soldered connections.

The suppliers of cathodic electrophoretic enameling systems must therefore be able to produce these materials, with which the previously good properties of the primers are not adversely affected at low stoving temperatures (low bake).

In U.S. Pat. No. 4.443,559, $\beta$-hydroxyurethanes are disclosed as cross-linking agents for cathodic electrophoretic enameling systems with a low stoving temperature. At 250° F. (121° C.), curing that is described as "appreciable" is achieved (column 6, lines 12–13). Only at 325° F. (163° C.) is the curing "excellent" and thus usable for car bodies. A further disadvantage is the handling of larger amounts of poisonous isocyanates during the production of this enamel system.

In EP-A-1 25 577, curing at low temperatures is achieved by the combination of onium group-containing polymers with special amino resins, however, at the expense of inferior corrosion protection properties.

The corrosion protection results, achieved at stoving temperatures below 160° C. even with the systems from DE-A-32 46 812 and DE-A-33 28 455, are also inadequate for the demands of the automobile industry.

DE-A-33 46 812 discloses curable, cationic, modified products of epoxide resins, which contain $\beta$-hydroxyalkylcarbamide ester groups, while DE-A-33 28 455 starts out from amino acid/salt adducts with urethanized amino groups.

In the DE-A-33 24 211 and DE-A-33 15 469, Michael addition products of monocarboxylate or dicarboxylate esters with compounds, which contain double bonds capable of reacting in a Michael addition reaction, are combined for cross linking with hydroxyl group-containing synthetic resins, for example, with cathodic electrophoretic enameling support resins.

As stoving conditions, a temperature of 130° to 200° C. over a period of 10 to 60 minutes and preferably a temperature of 150° to 180° C. over a period of 15 to 30 minutes are mentioned. In the examples, the stoving temperatures are between 150° and 200° C. Coatings, 16 to 18 $\mu$m thick and stoved at temperatures below 150° C., do not fulfill the requirements of the automobile industry, for example, with respect to good mechanical properties, sufficient resistance in the ASTM 117/6 or DIN 50 021 salt spray test or good outdoor exposure resistance.

DE-A-35 30 179 discloses the cross linking of cathodic electrophoretic enameling support resins, which have terminal or lateral double bonds, as well as reactive hydroxyl groups, with Michael addition products of monocarboxylic or dicarboxylic acids, which are capable of participating in a Michael addition reaction and suitable double bond-containing compounds. At stoving conditions of practically 60 minutes at 120° C., corrosion-resistant and robust coatings are obtained.

The EP-A-208 867, in which the cross linking of cathodic electrophoretic enameling support resins, which have hydroxyl groups, with components of the reaction products of diisocyanate with CH-active alkyl esters and polyamines is regarded as a transesterification reaction, also discloses coatings, for which adequate properties can be anticipated only at stoving temperatures above 120° C.

OBJECT OF THE INVENTION

It is an object of the invention to make possible the use of even lower stoving temperatures in practice and to avoid the disadvantages of the aforementioned methods.

DETAILED DESCRIPTION OF THE INVENTION

This objective is accomplished with an aqueous electrophoretic enamel coating material, which can be deposited at the cathode and which contains one or several synthetic resin vehicles with tertiary amino groups and, optionally, quaternary ammonium hydroxide groups, which can be made soluble in water by protonization with acids and which optionally contains pigments, corrosion inhibitors, anticrater agents, enamel adjuvants, enamel vehicles, plasticizers, catalysts and organic solvents, and which contains the following as synthetic resin vehicle:

(A) 90 to 50% by weight, based on the total portion of synthetic resin vehicle, of one or several polycondensation, polymerization and/or polyaddition resins, the resin or, in the event that several resins are present, their mixture
  a) having a number average molecular weight (Mn) of 700 to 10,000
  b) having $1.2 \times 10^{23}$ to $21.7 \times 10^{23}$ lateral or terminal double bonds per 1,000 g, corresponding to a hydrogenation iodine number of 5 to 90,
  c) optionally containing primary and/or secondary hydroxyl groups, corresponding to a hydroxyl number of 0 to 450 mg KOH/g of resin, and
  d) tertiary amino groups corresponding to an amine number of 30 to 450 mg KOH/g of resin.
(B) 10 to 50% by weight of one or several cross linking agents, which are compounds with methane tricarboxylic acid amide units of the formula

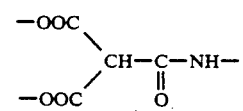

which contain, on the average, at least 2 groups with reactive hydrogens per molecule and are derived from a reaction product of a monoisocyanate or polyisocyanate with a malonic acid derivative, and C) 0 to 10% by weight of one or several capped diisocyanates and/or polyisocyanates.

The cross-linking agent (B) is described in the DE-A-35 41 140 as a curing component of a 2-component enamel. The components are stored separately there and mixed shortly before use. After the mixing, the enamel must be processed within the pot life, that is, within fewer than 15 hours. The known 2-component enamels are therefore not practical for electrophoretic enamels.

Surprisingly, however, it was observed that the inventive cathodic electrophoretic enamel bath is stable over several months and that adequate cross linking of the coatings is reached already at temperatures of 100° C. and higher in 15 minutes. A further advantage, aside from the cross linking at low stoving temperatures, is the possibility of being able to make do with a partial neutralization of the cathodic electrophoretic enamel vehicle for the preparation of the cathodic electrophoretic enamel bath and of not having to use complete neutralization so as to avoid the catalytic effect of the amino compound at room temperature.

The vehicles of component (A) are synthetic resins, which can be synthesized by polymerization, polyaddition and/or polycondensation and which carry amino groups and terminal or lateral double bonds, as described, for example, in the German Offenlegungsschriften 2,707,405, 2,707,482, 2,732,874 2,732,955, 2,749,776, 2,752,255, 2,752,256, 2,753,681 and 2,756,808.

Amine-epoxide resins with terminal or lateral double bonds are especially suitable vehicles. They are advisably obtained from polyglycidyl ethers with, on the average, two or more 1,2-epoxide groups per molecule.

These polyglycidyl ethers can be synthesized by
1) introducing glycidyl groups in an alkaline medium by way of, for example, epichlorohydrin,
   aa) in aliphatic, cycloaliphatic or aromatic OH-functional resins, such as epoxy novolaks, with the formation of polyglycidyl ethers,
   ab) in aliphatic, cycloaliphatic or aromatic COOH-functional resins with formation of polyglycidyl esters, or
   ac) in aliphatic, cycloaliphatic or aromatic NH$_2$-functional resins with formation of polyglycidyl amines,
2) polymerizing unsaturated glycidyl monomers, such as glycidyl (meth)acrylate, N-glycidyl(meth)acrylamide or allyl glycidyl ether, into acrylate copolymers.

In accordance with 1), it is especially preferred that the 1,2-epoxide group-containing resins be polyglycidyl ethers of the general formula $R'' = -(CR'_2)_n-$
$R''' = R'$ or halogen and preferably hydrogen
$m = 0$ to $6$
$n = 1$ to $3$ They have an average molecular weight (Mn) of about 300 to 2,000 and an epoxide equivalent weight of about 170 to 1,500. Such resins are reaction products of epichlorohydrin with dihydroxydiphenylmethane (bisphenol F) or dihydroxydiphenyl propane (bisphenol A). It is also possible to use appropriate heterocyclic polyepoxide compounds, such as 1,3-diglycidyl-5,5-dimethylhydantoin, triglycidyl isocyanurate or diepoxides from bisimides.

According to 2) it is preferred that the epoxide group-containing resins be glycidyl (meth)acrylate copolymers, which are obtained by the copolymerization of glycidyl methacrylate and unsaturated monomers. Unsaturated monomers are styrene, vinyltoluene and (meth)acrylate esters of different chain lengths, the methacrylate esters preferably containing linear or branched $C_1$ to $C_4$ alcohols and the acrylate esters preferably containing linear or branched $C_2$ to $C_8$ alcohols. The introduction of amino groups can be accomplished either by copolymerization with unsaturated amines such as dialkylaminoalkyl (meth)acrylates, appropriate acrylamides or N-vinylimidazole, or by the reaction of preferably secondary amines or aminoalcohols with the epoxy groups.

The introduction of the amino groups into component (A) is accomplished either by the addition of NH-reactive compounds to the epoxide group or by the reaction of the hydroxyl groups of the base resin with basic monoisocyanates, which are formed by the reaction of aromatic and/or aliphatic and/or ccloaliphatic diisocyanates or polyisocyanates with a dialkylaminoalkanol (see DE-A-27 07 404).

As NH-reactive compounds, primary monoalkylamines such as dialkylaminoalkylamine and/or preferably secondary monoamines such as dialkylamines, monoalkylhydroxyalkylamines or dihydroxyalkylamines, for example, are used. Examples of usable compounds are diethylamine, dimethylaminopropylamine, N-methylaminoethanol or diethanolamine. When primary amines or secondary diamines are used, for example, addition products of 1,6-hexanediamines and 2 moles of the glycidyl ester of Versatic acid, a chain extension reaction takes place.

Terminal and lateral double bonds here are understood to be activated terminal double bonds in the main and side chains. More particularly, they are double bonds in component (A) that are suitable for the Michael addition reaction.

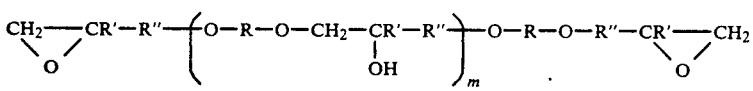

wherein

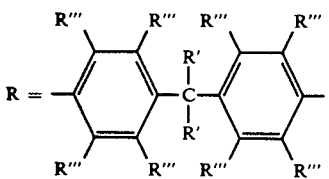

$R' =$ hydrogen or $-C_nH_{2n+1}$

The introduction of terminal or lateral double bonds into component (A) is accomplished either directly by the addition of, for example, half esters, containing (meth)acrylic acid or hydroxyalkyl (meth)acrylate, to the epoxide group or by the reaction of the hydroxyl group of the base resin with unsaturated monoisocyanates, which are obtained by the reaction of aromatic and/or aliphatic and/or cycloaliphatic diisocyanates or polyisocyanates with $\alpha,\beta$-unsaturated monocarboxylic acids or corresponding amides of carboxylic acids, such as hydroxyalkyl (meth)acrylates or dicarboxylate esters of hydroxyalkyl (meth)acrylates.

The direct addition to the epoxide group can also be accomplished, for example, with an unsaturated amine, such as diallylamine. In this way, the double bond can be introduced simultaneously with the amino group. If necessary, the amino group can be converted subsequently into a tertiary amino group.

A different synthesis method is the transetherification with an etherified methylolated (meth)acrylamide, such as methylol acrylamide monobutyl ether, as described in the DE-A-29 34 467.

The unsaturated amine-epoxide resin of component (A) may optionally be modified by using appropriate saturated compounds, in order to achieve optimum technical properties. If a mixture of an unsaturated amine-epoxide resin and a saturated amine-epoxide resin is used, it is necessary for the mixture to adhere to the parameters given above for the molecular weight, the hydrogenation iodine number and the amine number.

The vehicle of component (A) has a number average molecular weight (Mn) of 700 to 10,000 and preferably of 1,000 to 5,000. It contains at least one tertiary amino group per molecule. Independently of the tertiary amino groups, quaternary amino groups may also be present in the molecule.

The lower limit of the amine number (based on tertiary amine) should preferably be 50 and more particularly 70. The upper limit, on the other hand, should preferably be 120 and, more particularly, 100. If the amine number is too low, the solubility is too slight or, due to high a degree of neutralization, the pH in the deposition baths is too low. If the amine number is too high, the coating formed by the deposition does not adhere well or the surface of the coating contains bubbles. Especially suitable as vehicles of component (A) are aminoepoxide resins of bisphenol A polyglycidyl ethers, bisphenol F polyglycidyl ethers and epoxy novolaks, as well as methacrylate polymers, which are synthesized using unsaturated glycidyl monomers such as glycidyl (methacrylate), N-glycidyl methacrylamide or allyl glycidyl ethers. The amino groups are formed either by addition of NH-reactive compounds to the epoxide groups or by the reaction of the hydroxyl groups of the base resin with basic monoisocyanates, which may be obtained by the reaction of aromatic and/or aliphatic and/or cycloaliphatic diisocyanates or polyisocyanates with a dialkylaminoalkanol, as described in DE-A-27 07 405. The amino group can be introduced as described in DE-A-27 07 405.

Advantageous for the intercoat adhesion is the incorporation of substituted urea groups in component (A) and/or component (B). They can be introduced into the molecule by the reaction of polyisocyanate or capped polyisocyanate.

Suitable compounds of component (B) are, for example) the reaction products of diesters of malonic acid, such as dimethyl, diethyl, dibutyl or dipentyl malonates, with monoisocyanates or polyisocyanates.

Examples of such isocyanates, which may be used pursuant to the invention, are aliphatic isocyanates, such as n-butyl isocyanate, octadecyl isocyanate, cycloaliphatic isocyanates such as cyclohexyl isocyanate, araliphatic isocyanates such as benzyl isocyanate or aromatic isocyanates such as phenyl isocyanate, polyisocyanates such as tetramethylene diisocyanate, hexamethylene diisocyanate, 2,2,4-trimethylhexamethylene diisocyanate, 1,12 dodecane diisocyanate, 1,3-cyclohexane diisocyanate, 1,4-cyclohexane diisocyanate, 1-isocyanate-3,3,5-trimethyl-5-isocyanato-methylcyclohexane (=isophorone diisocyanate or IPDI), perhydro-2,4'- and/or 4,4'-diphenylmethane diisocyanat, 1,3- and 1,4-phenylene diisocyanate, 2,4- and 2,6-toluylene diisocyanate, diphenylmethane-2,4'- and/or -4,4'-diisocyanate, 3,2'- and/or 3,4-diisocyanato-4-methyldiphenylmethane, 1,5-naphthylene diisocyanate, 4,4',4''-triphenylmethane triisocyanate or mixtures of these compounds.

Aside from these simple isocyanates, those having heteroatoms in the group linking the isocyanate groups are also suitable. Examples of these are polyisocyanates having carbodimide groups, allophanate groups, isocyanurate groups, urethane groups, acylated urea groups and biuret groups.

Especially well suited for the inventive method are the known polyisocyanates, which are used mainly in the production of enamels, such as modified products of the above-mentioned simple polyisocyanates, especially tris-(6-isocyanatohexyl)-biuret or low molecular weight polyisocyanates having urethane groups, similar to those that can be obtained by the reaction of an excess of IPDI with simple multihydric alcohols having molecular weights ranging from 62 to 300, especially with trimethylolpropane. Of course any mixtures of the aforementioned polyisocyanates can be used to synthesize the inventive products.

Furthermore, suitable polyisocyanates are the known prepolymers with terminal isocyanate groups, similar to those that may be obtained by the reaction of the abovementioned simple polyisocyanates, especially diisocyanates, with excess quantities of organic compounds with at least two groups, which are capable of reacting with isocyanate groups. Used as such are especially compounds, the molecular weight of which falls within the range of 300 to 10,000 and preferably 400 to 6,000 and which have at least two amino groups and/or hydroxy groups. Preferred is the use of the appropriate polyhydroxyl compounds, such as hydroxypolyesters, hydroxypolyethers and/or hydroxyl group containing acrylate resins, which are known in polyurethane chemistry.

In these known prepolymers, the ratio of isocyanate groups to hydrogen atoms reactive with respect to NCO is 1.05 to 10:1 and preferably 1.1 to 3:1, the hydrogen atoms preferably originating from hydroxyl groups.

The nature and the quantity ratios of the starting materials used in the synthesis of the NCO prepolymers are, moreover, preferably selected so that the NCO prepolymers have a) an average NCO functionality of 2 to 4 and preferably 2 to 3 and b) an average molecular weight of 500 to 10,000 and preferably of 800 to 4,000.

However, reaction products of esters and partial esters of multihydric alcohols and malonic acid with monoisocyanates are also suitable as component B). Multihydric alcohols are, for example, dihydric to pentahydric alcohols such as ethylene glycol, the various propylene, butylene, pentylene and hexylene glycols, polyethylene and polypropylene glycols, glycerin, trimethylolethane and trimethylolpropane, pentaerythritol, trihydroxyhexane and sorbitol.

Also suitable are the corresponding malonates of OH group-containing acrylate resins, polyesters, polyethers, polyester amides and polyester imides and/or reaction products of hemiesters of malonic acid, such as monomethyl malonate, with aliphatic and aromatic epoxide resins, such as epoxide group-containing acrylate resins, glycidyl ethers of polyols such as hexylene glycol, neopentyl glycol, diphenylolpropane and diphenylolmethane and glycidyl group-containing hydantoins, as well as mixtures of the compounds with methane carboxylic acid amide units with the listed malonate ester of multihydric alcohols.

As component C, 0 to 10% by weight of capped diisocyanates and/or polyisocyanates can be added to the inventive coating material. Preferably, those diisocyanates and/or polyisocyanates are used, which are de-capped in the system at the stoving temperatures used. Since the inventive coating material can be stoved at very low temperatures, a diisocyanate and/or a polyisocyanate is preferably used, which is also de-capped at these low stoving temperatures, for example, at a temperature below 140° C. Such diisocyanate and polyisocyanate are commercial products and familiar to those skilled in the art.

The capped or blocked diisocyanates and/or polyisocyanates (component C) which may optionally be used, are described, for example, in Farbe und Lack, volume 89, No. 12, 1983, pages 928-934. The capped or blocked diisocyanates or polyisocyanates, which can be used, are stable at room temperature in the presence of the functional groups of the other components and water. On stoving, however, they can react with the corresponding functional groups of the other components. Typical examples of suitable isocyanates are aliphatic diisocyanates, such as trimethylene, tetramethylene, hexamethylene and trimethylhexamethylene diisocyanate; cycloaliphatic diisocyanates such as 1,4-cyclohexane diisocyanate, 1,2-cyclohexane diisocyanate and 3-isocyanatomethyl-3,5,5-trimethylcyclohexyl isocyanate; aromatic isocyanates such as m-phenylene diisocyanate and 1,4-naphthalene diisocyanate; aliphatic aromatic isocyanates such as 4,4-diphenylmethane diisocyanate, and 2,4- or 2,6-toluylene diisocyanate or their mixtures. Capped prepolymers of the diisocyanates, for the prepolymer synthesis of which polyols such as trimethylol propane and/or polyamines such as diethylenetriamine are used, are preferably used.

As blocking or capping agents, alcohols, phenols, thioalcohols, thiophenols, oximes, hydroxamate esters, hydroxyalkyl (meth)acrylates, alkanolamines such as dimethylethanolamine, diethanolamine, etc., amines, amides, imides and/or β-dicarbonyl compounds may be used.

A further possibility for synthesizing capped or blocked isocyanates lies in the reaction of diamines or polyamines with alkylene carbonates, as a result of which β-hydroxyurethanes are formed. These reactions are described in the DE-A-32 46 812, page 3, line 29 to page 4, line 8. According to the DE-A-32 46 812, the polyamines are reacted only partially with alkylene carbonate. It is, however, obvious to those skilled in the art that, for example, all 3 amino groups of the diethylenetriamine molecule can be reacted with alkylene carbonate, for example with propylene carbonate. Especially preferred for the present invention are capped prepolymers of aliphatic triol, aliphatic-aromatic diisocyanate and aliphatic ketoxime.

The use of diisocyanate and/or polyisocyanate in the inventive coating material is not absolutely essential. The use of components A and B alone leads to excellent coatings with a satisfactory surface and outstanding corrosion protection action. It is therefore possible to formulate the inventive coating material solely on the basis of components A and B. The possible addition of the capped diisocyanate and/or polyisocyanate, however, leads to a further improvement in the leveling properties, as a result of which a particularly advantageous surface is developed; moreover, the corrosion inhibition is improved by this possible addition.

The inventive, cationic vehicle is made water dispersible by a known method involving the protonization with known acids.

After the deposition of the inventive coating material in the usual manner in the electrophoretic enameling bath, the coatings obtained are cured by stoving. The addition of a catalyst is not necessary, since vehicle A, contained in the inventive coating material, itself acts as a catalyst. It is, however, possible to use catalysts, which can be added in the usual manner in the course of the preparation of the deposition bath or its components. Examples of these are catalyzing lead compounds, such as lead octoate, basic lead silicate, 1,4-diazabicyclo(2,2,2)-octane (DABCO), amidines such as N,N,N,N-tetramethylguanidine, 1,8-diazabicyclo-(5,4,0)-undec-7-ene, 1,4-diaza-bicyclo(4,3,0) non-5-ene, as well as other catalysts known to those skilled in the art for the curing reaction, provided that they fit into the system without disadvantages.

All usable pigments can be employed for the inventive electrophoretic enamel coating material. "Pigments" are also understood to include fillers (extenders), aluminum bronzes and the like. Whether a pigment can be used does not depend on the direction of its migration in the electric field, since the deposition process in electrophoretic enameling is initiated by the coagulation of the electrophoretic enamel vehicle, as described in the technical papers "Zum Mechanismus der electro Lackierung" (The Mechanism of Electrophoretic Enameling) by Dr. Fritz Beck, Farbe und Lack, volume 72, No. 3, 1966, pages 218 to 224 and "Betrachtungen und Versuche zur Elektrotauchlackierung" (Reflections on and Experiments with Electrophoretic Enameling) by Dr. F. Beck, Dr. H. Pohlemann and Dr. H. Spoor, Farbe und Lack, volume 73, No. 4/1967, pages 298 to 310. Nonionic vehicles, such as plasticizers (dibutyl phthalate and other phthalate esters), plasticizer resins, cumaroneindene resins, hydrocarbon resins and the corresponding oils (such as cumarone-indene oil) may be added to improve special properties, provided that they can be emulsified in the filling or replenishing material in the cathodic electrophoretic enameling bath.

Additives, such as leveling agents, anticrater agents, defoamers, solvents, etc., can be selected by known procedures and added.

The metallically conducting workpieces are coated cathodically with the inventive electrophoretic enamel coating material by known procedures and stoved for a period of 15 to 60 minutes preferably at temperatures of 100° to 140° C. Of course, the use of higher temperatures, as customarily used in methods of the state of the art, for example, up to 180° C., also leads to good results.

The attainable thickness of the coating can be influenced, for example, by the coating conditions, the vehicle, the degree of neutralization, the type and amount of solvent and the nature of the substrate. The same layer thicknesses are attainable as with methods of the state of the art, for example, a dry film thickness of up to 60 μm and more with a perfect surface and an outstanding throwing power on, for example, zinc-phosphated steel.

The parameters for increasing the thickness of the layer are the same as those already known for anodic electrophoretic enameling. On the assumption that a closed film with an insulating action is formed by the deposition, the thickness increases with increasing voltage and increasing bath temperature. The duration of the coating process can also bring about an increase in layer thickness up to a self-setting limit. The lower molecular weight vehicle or the vehicle with the lower glass transition temperature leads to a higher layer thickness than the chemically identical vehicle with a higher molecular weight or a higher glass transition temperature. A favorable condition for a higher layer thickness is a low deposition equivalent.

In selecting solvents to achieve layers of high thickness, those solvents were preferred, which decrease the breakdown voltage as little as possible, such as hexyl glycol (ethylene glycol monohexyl ether), 2,2,4-trimethyl-1,3-pentanediol monoisobutyrate or phenoxypropanol.

The favorably low stoving temperatures are a significant advantage of the inventive coating materials. For example, they enable metal parts to be enameled together with heat-sensitive materials, such as plastics or rubber or soldered joints.

EXAMPLES

The percentages, given in the examples, are percentages by weight.

Preparation of the Vehicle

A1) Unsaturated Amine-Epoxide Resin

In a reactor equipped with stirrer, dropping funnel and thermometer, 520 g of an epoxide resin based on bisphenol A (epoxide equivalent weight of 260) are dissolved at 60° to 70° C. in 453 g of ethyl glycol acetate (monoethylene glycol monoethyl ether acetate), 0,2 g hydroquinone and 536 g of a hemiester of 2 moles of tetrahydrophthalic acid anhydride and 2 moles of hydroxyethyl acrylate are added and the temperature is increased to 100° to 110° C. The reaction is continued at this temperature until the acid number reaches a value of less than 5 mg KOH/g of solid resin. The reaction product is subsequently treated at 60° to 70° C. with 750 g of a 70% solution of a monoisocyanate of 2 moles of toluylene diisocyanate and 2 moles of dimethylethanolamine in ethylene glycol acetate and reacted until the NCO value practically reaches a value of zero.

solids content: 70% (calculated)
hydrogenation iodine number: 30 (solid resin)
hydroxyl value*: 0.06 (corresponding to a hydroxyl number of 34 mg KOH/g of resin)
*moles of hydroxide/100 g of solid resin A2) Unsaturated Amine-Epoxide Resin An epoxide resin based on bisphenol A (528 g) with an epoxide equivalent weight of 490 is dissolved in 221 g of diethylene glycol dimethyl ether. Diethanolamine (38.3 g) is added at 60° C. and this solution is maintained until the milliequivalents (epoxide and amine) are determined to be 1.33 per gram by titration. After that, a mixture of 18.6 g dimethylaminopropylamine and 11.6 g of an addition product of 1 mole of 1,6-hexanediamine and 2 moles of the glycidyl ester of Versatic acid are added and the exothermic reaction is allowed to go to completion. Subsequently, the temperature is maintained for one hour at 90° C. and then for 3 hours at 120° C.

The product is diluted with 75 g of diethylene glycol dimethyl ether to a solids content (determined by baking for 40 minutes at 180° C.) of 70%.

amine number: 88 mg KOH/g of resin
viscosity: 513 Mpas (after diluting to 50% with diethylene glycol dimethyl ether at 25° C.)

The prepolymer (945.5 g), obtained above, is mixed with 2 g of lead octoate (31% lead), 2 g of 4-methyl-2,6-di-t-butylphenol and 54.5 g of methyl acrylamide monobutyl ether. Finally, 27.2 g of n-butanol are distilled off at temperatures from 100° C. to 130° C. under a slight vacuum.

solids content: 77.8% (40 minutes at 180° C.)
hydrogenation iodine number: 12 (solid resin)
amine number: 87 mg KOH/g of solid resin
viscosity: 741 mPas (after diluting to 50% with diethylene glycol dimethyl ether at 25° C.)

A3) Mixture of Saturated and Unsaturated Amine-Epoxide Resin a) Saturated amine epoxide resin Following the directions of EP-A1-12463, page 17, Example (b), 391 g diethanolamine, 189 g of 3-(N,N-dimethylamino)-propylamine and 1147 g of an adduct of 1,6-diaminohexane and Versatic acid glycidyl ester (commercial product, Cardura E 10, in which the mole ratio is 1:2) are added to 5274 g of epoxide resin based on bisphenol A (epoxide equivalent weight of approximately 472) in 2,999 g of ethylene glycol monomethyl ether. The mixture is maintained for 4 hours with stirring at 85° to 90° and then for 1 hour at 120° C.

b) Unsaturated Amine-Epoxide Resin Mixture

Vehicle solution A2 (322 g), 83 g of vehicle solution A3a) and 77 g of methoxypropanol are mixed for 15 minutes with good stirring solids content: 63.9% (40 minutes at 180° C.)
hydrogenation iodine number: 10 (solid resin)
Cross Linking Agent B1)

Following the directions of Example B 3 of DE-A-35 41 140, page 8, 216 g of dibutyl malonate and 1 g of sodium methylate are treated at 60° C. with 190 g of an isocyanurate - polyisocyanate (NCO content=21%), obtained by the trimerization of hexamethylene diisocyanate. When the free isocyanate content reaches a value of less than 0.5%, 174 g of methoxypropanol are added (instead of xylene) and the product is filtered.

solids content: 70%
C-H equivalent weight: 55%

EXAMPLE 1

In a bead mill, 250 g of vehicle A1, 110 g of methoxypropanol, 6.4 g of formic acid (50% in water), 5.5 g of carbon black and 44.5 g of kaolin are ground for 40 minutes. After that, 6 g of formic acid (50% in water) and 107.2 g of cross-linking agent B1 are added to the ground material under the dissolver. After that, 1470.4 g of completely deionized water is added slowly with stirring.

solids content: 13.9% (30 minutes at 180° C.)

MEQ value: 45 (mmoles formic acid/100 g solid resin)

The coating was applied on zinc-phosphated sheet steel at a bath temperature of 30° C. for 2 minutes at 110 V. After rinsing with water and stoving for 30 minutes at 120° C. a 20 μm dry film is formed. The film shows no visible change after 100 MEK rubs, that is, after 100 double strokes, carried out under a load of 1 kg with cotton soaked in methyl ethyl ketone.

EXAMPLE 2

In a bead mill, 264 g of vehicle solution A2, 90 g of methoxypropanol, 10 g of formic acid (50% in water), 7 g of carbon black and 61.5 g of kaolin are ground for 40 minutes. After that, 147 g of vehicle solution A2, 28 g of methoxypropanol, 9.3 g of formic acid (50% in water) and 171.2 g of cross linking agent B1 are added to the milled material under the dissolver. After that, the concentrate is brought to a total volume of 3 liters with fully deionized water.

The coating was applied on zinc-phosphated sheet steel at a bath temperature of 30° C. for 2 minutes at 160 V. After rinsing with water and stoving for 30 minutes at 100° C., an 18 μm dry film is formed. The film shows no visible change after 100 MEK rubs (see above for description).

EXAMPLE 3

Vehicle solution A3 (482 g) and 15.3 g of formic acid (50% in water) are intimately mixed with 135.6 g of cross linker B1 and, with stirring, diluted to 3 liters with fully deionized water.

solids content: 10.7% (30 minutes at 180° C.)
MEQ value: 49.3% (mmoles of formic acid/100 g of solid resin)

Zinc phosphated steel sheets are coated as described above and stoved at temperatures of 80°, 90°, 100° and 110° C. After acting for 1 minute, acetone reveals no sign of attacking the film stoved at 100° C.

EXAMPLE 4

Example 1 is repeated with the following quantities: 250 g vehicle A1, 100 g methoxypropanol, 11 g formic acid (50% in water), 5.5 g carbon black, 8.2 g of a 78% lead silicate paste, 36.3 g kaolin, 8.0 g Octa Solingen Pb 31 and 107.2 g cross linking agent B1. The method is similar to that of Example 1. The product is finally diluted to 2 liters with fully deionized water.

solids content: 14.7% (30 minutes at 180° C.)
MEQ value: 46 (mmoles of formic acid/100 g of solid resin)

The film is applied during 2 minutes at 140 V and 30° C. The film, dried at 120° C., has a thickness of 21 μm and behaves towards MEK rubs as does the film of Example 1.

EXAMPLE 5

Vehicle solution A2 (325 g), 42 g of an isophorone diisocyanate capped with butanone oxime, 107.1 g of cross linking agent B1 and 13.2 g of formic acid (50% in water) are intimately mixed and diluted with stirring to 3 liters using fully deionized water.

solids content: 10.2% (30 minutes at 180° C.)
MEQ value: 48 (mmoles of formic acid/100 g of solid resin)

Coatings, similar to those described in Example 3 and stoved at 120° to 130° C., produce MEK-resistant films. On a chromic acid-rinsed low-zinc phosphated steel, the films show a migration below the cut of less than 2 mm (evaluated according to DIN 50021) after a 504-hour salt spray test according to DIN 50017.

We claim:

1. An aqueous electrophoretic coating material which can be deposited at the cathode, comprising component A of one or several synthetic resin vehicles with amino groups that can be made water-soluble or water-dispersible by protonization with acids, and component B of a crosslinking agent that on being baked reacts with component A, said component A being present in a concentration of 90 to 50% by weight based on the total synthetic resin vehicle and being one or more polycondensation, polymerization and polyaddition resins, said one or more resins having (i) an average molecular weight of 700 to 10,000, (ii) $1.2 \times 10^{23}$ lateral of terminal double bonds per 1,000 g, corresponding to a hydrogenation iodine number of 5 to 90, and capable of undergoing Michael Addition, and (iii) tertiary amino groups corresponding to an amine number of 30 to 450 mg kov/g of resin, and component B is 10 to 50% by weight of one or more crosslinking agents which are the reaction products of a monoisocyanate or polyisocyanate with a malonic ester or malonic half ester, containing on the average at least two groups with reactive hydrogen based on methane tricarboxylic acid amide units of the formula

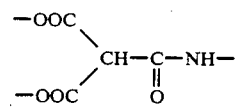

per molecule.

2. The coating material of claim 1, further comprising one or more of a pigment, corrosion inhibitor, anti-cratering agent, enamel adjustment, enamel vehicle, plasticizer, catalyst, and organic solvent.

3. The coating material of claim 1, wherein the resins of component A further comprise primary and/or secondary hydroxyl groups corresponding to a hydroxyl number of 0 to 45 mg koh/g of resin.

4. The coating material of claim 1, which further comprises as component C from 0% to 10% by weight of one or more capped diisocyanates and/or polyisocyanates.

5. The coating material of claim 1, which contains 90 to 50% by weight of component A and 10 to 50% by weight of component B.

6. The coating material of claim 1, which contains 65 to 80% by weight of component A and 20 to 35% by weight of component B.

7. The coating material of claim 1, wherein the lateral or terminal double bonds are introduced in component (A) by the addition of acrylic acid or methacrylic acid or their derivatives to epoxide groups.

* * * * *